Dec. 16, 1958 K. JOSTEN 2,864,955

BLOCKING OSCILLATOR FOR PRODUCING A HARMONIC FREQUENCY SPECTRUM OF A HIGH OUTPUT POWER

Filed Aug. 15, 1956

INVENTOR

K. JOSTEN

BY Robert Harding Jr.

ATTORNEY

United States Patent Office 2,864,955

Patented Dec. 16, 1958

2,864,955

BLOCKING OSCILLATOR FOR PRODUCING A HARMONIC FREQUENCY SPECTRUM OF A HIGH OUTPUT POWER

Kurt Josten, Stuttgart, Germany, assignor to International Standard Electric Corporation, New York, N. Y., a corporation of Delaware Application August 15, 1956, Serial No. 604,101

Claims priority, application Germany August 20, 1955

4 Claims. (Cl. 250—36)

The invention relates to the production of a spectrum of carrier voltages which are in harmonic frequency relation.

It has already been proposed to employ blocking or relaxation oscillators for obtaining harmonic frequencies since such oscillators generate a period rather than a sinusoidal oscillation, and hence produce a harmonic frequency spectrum. The splitting up of this spectrum into its components is effected by means of a filter combination, the outputs of which may serve to feed or supply a number of carrier frequency modulators.

The practical embodiment of a blocking oscillator, however, gives rise to quite a number of technical problems. For example, the timed succession of the pulses, as a rule, is not left to the involved circuit elements and to the operational data of the tube, but instead, is very exactly controlled with the aid of a special control frequency. A synchronising voltage, additionally superposed to the grid, however, can only satisfy this requirement when its amplitude is made sufficiently large. Therefore, in many cases of practical application, it is customary to use, in lieu of a sinusoidal oscillation, a corresponding impulse voltage for the synchronisation of a blocking oscillator, the production of which, however, is linked to considerable expenditures.

Furthermore, for the purpose of enabling a better utilization of a blocking oscillator, the resonance resistances of the interconnected or inserted frequency filters should not be chosen too small. These filters have small relative bandwidths, and the input voltage thereof, after having been excited by an impulse, therefore, corresponds to a slightly damped or attenuated sinusoidal oscillation. The sum of these damped sinusoidal oscillations results, exactly in the moment or at the time position at which the next successive impulse is supposed to follow, in a negative voltage impulse of the anode voltage and, thus calls for a higher positive grid voltage for releasing the "firing process" of the tube. The mode of operation of such a circuit arrangement accordingly can only be accomplished by either reducing the power taken from the output or only by means of synchronising pulses of a high amplitude.

For avoiding the aforementioned disadvantages it is an object of the invention to provide a blocking oscillator which, at high output power, is capable of oscillating with a low synchronising voltage. This may be accomplished, according to the invention, in such a way that, besides the grid voltage, which is derived from the anode voltage and which effects the actual relaxation process, there is fed to the grid of the tube an additional control voltage obtained from the filter combination. Thereby the control voltage is so dimensioned that it will, to a large extent, cancel the action of the voltage, appearing at the filter combination as mentioned, upon the control voltage of the tube which is composed of the grid voltage and of the anode or plate voltage. By means of this arrangement it is achieved that the starting point of the oscillation will become independent of the output resistance of the circuit arrangement.

In the following the features of the invention will be described in particular with reference to the exemplified embodiments of the invention as shown in the accompanying drawings in which.

Both of the circuit arrangements are known without the transformer Tr2. The filter combination 1, 2 . . . *n* is traversed by the impulse current of the tube 3. The transformer Tr1 applies the control or feedback voltage, which is derived from the plate current, with a positive phase, via the R–C-circuit, to the grid of the tube. The frequency of the resulting relaxation process is thereby timed or kept in-step or rhythm by means of a synchronising voltage S in known manner.

According to the invention an additional transformer Tr2 is provided in series with the transformer Tr1, its primary winding being connected across the filter combination. By the action of the transformer Tr2 there is now applied to the grid, an additional feedback voltage U2 in series with the control voltage.

In this case, the feedback voltage U2 is smaller than the voltage U1 by the amplification factor $\mu$ of the tube and represents, like the voltage U1, a sum of harmonics of the relaxation frequency or linear time base. The external resistance, as constituted by the filters has about the same magnitude with respect to all the required frequencies of the generated or produced spectrum and should be dimensioned in such a way that it is almost adapted or matched to the internal resistance of the tube at the time position of the maximum power output.

Figure 1:
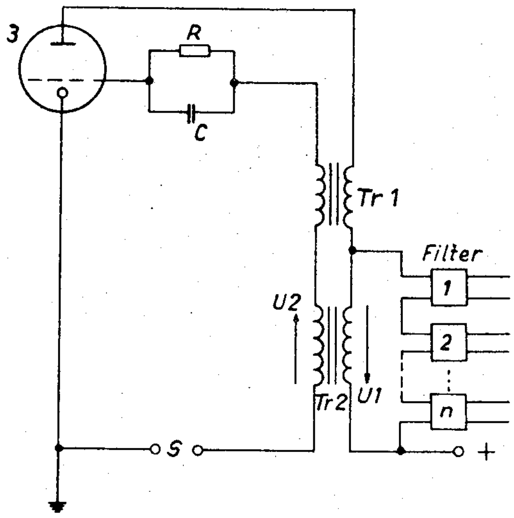
Fig. 1 shows a blocking oscillator, the filter combination of which is arranged in the plate (anode) circuit of the tube.
Figure 2:
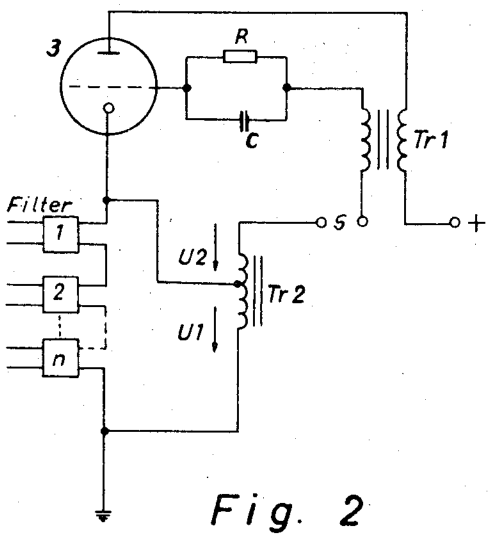
Fig. 2 shows a modified example, in which the filter combination is arranged in the cathode branch of the blocking oscillator.

The relaxation oscillators as shown in Figs. 1 and 2 of the accompanying drawings, and which in the case of relatively high filter resistances, would not at all be capable of being excited to perform the free oscillations of the desired fundamental frequency without the employment of the transformer Tr2, will now produce by this arrangement a distinct harmonic vibration spectrum of a high efficiency or output power. They differ merely in the kind of position of the filter combination which in Fig. 1 is connected in the anode circuit whereas in Fig. 2 it is connected in the cathode lead of the tube 3. The synchronisation thereof can be accomplished with the aid of the fundamental frequency, a multiple thereof, or naturally, also with the aid of the corresponding impulses.

The practical application of the relaxation oscillator according to the invention, of course, is in no way limited or restricted to the range or the field of carrier-frequency modulation.

While I have described above the principles of my invention in connection with specific apparatus, it is to be clearly understood that this description is made only by way of example and not as a limitation to the scope of my invention.

What is claimed is:

1. A blocking oscillator for producing a harmonic frequency spectrum comprising a tube having an anode, cathode and control grid, a first transformer having a primary winding connected in the anode circuit and a secondary winding connected in the grid circuit of said tube to provide the relaxation process, a plurality of filters having their input circuits connected in series in the cathode conductor of said tube, and a second transformer having one winding connected across said series input circuits and a second winding connected in series with the secondary winding of said first transformer.

2. A blocking oscillator for producing a harmonic frequency spectrum comprising a tube having an anode, cathode and control grid, transformer means for applying a feedback control voltage from the anode circuit to the grid circuit, a resistance capacitance network connected to said transformer means and grid, and a source of synchronizing voltage connected to the grid to provide the relaxation process, a plurality of filters connected in parallel as loads for deriving harmonic frequencies from said oscillator and connected in an output circuit of said tube, a second transformer connected across said parallel filters for deriving an additional control voltage from said filters and means for applying said additional control voltage to said grid.

3. A blocking oscillator according to claim 2, wherein said additional control voltage relative to the output voltage of said oscillator is approximately equal to the reciprocal of the amplification factor of said tube.

4. A blocking oscillator for producing a harmonic frequency spectrum comprising a tube having an anode, cathode and control grid, a first transformer having a primary winding connected in the anode circuit and a secondary winding connected in the grid circuit of said tube, a resistance capacitance network connected to said transformer and grid, and a source of synchronizing voltage connected to the grid to provide the relaxation process, a plurality of filters having their input circuits connected in series in said anode circuit, and a second transformer having a primary winding connected across said series input circuits and a secondary winding connected in series with the secondary winding of said first transformer.

References Cited in the file of this patent

UNITED STATES PATENTS

| | | |
|---|---|---|
| 1,592,388 | Slepian | July 13, 1926 |
| 1,934,574 | Vos | Nov. 7, 1933 |
| 2,537,696 | Palmer | Jan. 9, 1951 |